(12) United States Patent
Muraoka et al.

(10) Patent No.: US 10,511,007 B2
(45) Date of Patent: Dec. 17, 2019

(54) NONAQUEOUS ELECTROLYTE SECONDARY BATTERY

(71) Applicant: Sanyo Electric Co., Ltd., Daito-shi, Osaka (JP)

(72) Inventors: Masashi Muraoka, Hyogo (JP); Tomoharu Arai, Hyogo (JP); Tetsuya Okado, Hyogo (JP); Shingo Tode, Hyogo (JP); Toyoki Fujihara, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 52 days.

(21) Appl. No.: 15/684,415

(22) Filed: Aug. 23, 2017

(65) Prior Publication Data

US 2018/0097219 A1 Apr. 5, 2018

(30) Foreign Application Priority Data

Sep. 30, 2016 (JP) .................. 2016-194510

(51) Int. Cl.
*H01M 2/26* (2006.01)
*H01M 2/02* (2006.01)
(Continued)

(52) U.S. Cl.
CPC ........... *H01M 2/263* (2013.01); *H01M 2/024* (2013.01); *H01M 2/22* (2013.01); *H01M 4/661* (2013.01);
(Continued)

(58) Field of Classification Search
CPC ........ H01M 2/263; H01M 2/024; H01M 2/22; H01M 2/30; H01M 4/661; H01M 10/0431; H01M 10/0587; H01M 10/052
See application file for complete search history.

(56) References Cited

U.S. PATENT DOCUMENTS

2010/0223780 A1 9/2010 Kondou et al.
2010/0233529 A1 9/2010 Nansaka et al.
(Continued)

FOREIGN PATENT DOCUMENTS

JP 2016-119210 A 6/2016

OTHER PUBLICATIONS https://www.engineeringtoolbox.com/young-modulus-d_773.html by Mar. 12, 2015 (hereinafter, "engineeringtoolbox") (Year: 2015).*
(Continued)

*Primary Examiner* — Jimmy Vo
(74) *Attorney, Agent, or Firm* — Westerman, Hattori, Daniels & Adrian, LLP

(57) ABSTRACT

A nonaqueous electrolyte secondary battery including a positive electrode collector electrically connected to a positive electrode plate, a negative electrode collector electrically connected to a negative electrode plate. At least one of the collectors includes a first-side base portion disposed near the sealing plate, and a first-side lead portion connected to one end portion of the first-side base portion and extending towards an electrode body. The first-side lead portion includes a first-side power generating element joining portion joined to a lateral side of the electrode body, and a first-side inclined portion inclined with respect to a thickness direction of the electrode body from the first-side power generating element joining portion towards an outer side in the thickness direction. A total weight of the electrode body and nonaqueous electrolyte contained in the electrode body ranges from 200 g or more to 500 g or less.

10 Claims, 9 Drawing Sheets

(51) Int. Cl.
*H01M 10/0587* (2010.01)
*H01M 2/22* (2006.01)
*H01M 4/66* (2006.01)
*H01M 10/04* (2006.01)
H01M 2/30 (2006.01)
H01M 10/052 (2010.01)

(52) U.S. Cl.
CPC ... *H01M 10/0431* (2013.01); *H01M 10/0587* (2013.01); *H01M 2/30* (2013.01); *H01M 10/052* (2013.01); *H01M 2220/20* (2013.01); *Y02E 60/122* (2013.01)

(56) References Cited

U.S. PATENT DOCUMENTS

| | | | | |
|---|---|---|---|---|
| 2010/0316897 | A1* | 12/2010 | Kozuki | H01M 2/22 |
| | | | | 429/94 |
| 2011/0052976 | A1* | 3/2011 | Ishii | H01M 2/22 |
| | | | | 429/178 |
| 2012/0107652 | A1* | 5/2012 | Iyori | H01M 2/263 |
| | | | | 429/61 |
| 2016/0181589 | A1 | 6/2016 | Yokoyama et al. | |

OTHER PUBLICATIONS https://files.transtutors.com/cdn/assets/the-moment-of-inertia-of-composite-section.jpg by Feb. 15, 2015 (hereinafter, " transtutors") (Year: 2015).*

* cited by examiner

NONAQUEOUS ELECTROLYTE SECONDARY BATTERY

CROSS REFERENCE TO RELATED APPLICATIONS

The present invention application claims priority to Japanese Patent Application No. 2016-194510 filed in the Japan Patent Office on Sep. 30, 2016, the entire contents of which are incorporated herein by reference.

BACKGROUND OF THE INVENTION

Field of the Invention

The present disclosure relates to a nonaqueous electrolyte secondary battery.

Description of Related Art

In a case in which a nonaqueous electrolyte secondary battery is mounted and used in a vehicle, high input and output characteristics and a large battery capacity are required to achieve high performance of the vehicle. In order to respond to the above requirement, one may conceive of increasing the ratios of the weigh and the volume of a power generating element occupying the battery outer package.

Japanese Published Unexamined Patent Application No. 2016-119210 (Patent Document 1) describes a square secondary battery in which a first area of a positive electrode collector is disposed near and parallel to a sealing body, and in which two second areas of the positive electrode collector extend from both sides of the first area towards the two lateral sides of the power generating element in the thickness direction.

Furthermore, a positive electrode core body exposed portion is formed at an end portion of the positive electrode plate constituting the power generating element, and the two second areas are connected to the positive electrode core body exposed portion by welding.

BRIEF SUMMARY OF THE INVENTION

In a case in which the ratios of the weight and the volume of the power generating element are increased as describe above, there is a margin of improvement from the viewpoint of improvement in reliability. In the course of developing a nonaqueous electrolyte secondary battery, the inventors have found that in a nonaqueous electrolyte secondary battery having a specific configuration, when the nonaqueous electrolyte secondary battery is dropped with the surface provided with the terminals of the positive and negative electrodes facing downwards, short circuit of the positive and negative electrodes is likely to be caused in the power generating element.

Meanwhile, as in the configuration described in Patent Document 1, when both lateral portions of the power generating element of the collector in the thickness direction and the portions disposed near the sealing body are connected to each other in a branched manner, since the rigidity of the portions supporting the power generating element can be increased, internal short circuiting may be able to be prevented in a drop test. However, forming the collector in the branched manner as above becomes a factor that increases the weight of the secondary battery.

An object of the present disclosure is to, in a nonaqueous electrolyte secondary battery, suppress weight increase, facilitate obtainment of a high battery capacity, and prevent internal short circuiting from occurring when dropped.

A nonaqueous electrolyte secondary battery according to an aspect of the present disclosure includes a flat power generating element including a positive electrode plate, negative electrode plate, and a separator that electrically isolates the positive electrode plate and the negative electrode plate from each other; an outer package, inside of which the power generating element is disposed; a sealing body that closes an opening of the outer package; a positive electrode collector electrically connected to the positive electrode plate; a negative electrode collector electrically connected to the negative electrode plate; and nonaqueous electrolyte. In the nonaqueous electrolyte secondary battery, at least one of the collectors between the positive electrode collector and the negative electrode collector includes a first-side base portion disposed near the sealing body, and a first-side lead portion disposed so as to be connected to one end portion of the first-side base portion and to extend towards the power generating element, the first-side lead portion includes a first-side power generating element joining portion joined to a lateral side of the power generating element, and a first-side inclined portion inclined with respect to a thickness direction of the power generating element from the first-side power generating element joining portion towards an outer side in the thickness direction, and a sum of a weight of the power generating element and a weight of the nonaqueous electrolyte contained in the power generating element is within a range of 200 g or more to 500 g or less.

The inventors have found that in a case in which the sum of the weights of the power generating element and the nonaqueous electrolyte contained in the power generating element is 200 g or more, when the square secondary battery is dropped with the surface in which the terminals of the positive and negative electrodes are provided is faced downwards, short circuit easily occurs in the positive and negative electrodes. The present disclosure has been made based on such knowledge. Furthermore, the inventors have found that in a case in which the lead portion of the collector includes an inclined portion that is inclined with respect to the thickness direction of the power generating element, and the sum of the weight of the power generating element and the nonaqueous electrolyte contained in the power generating element is 500 g or less, the above short circuiting can be prevented.

In the nonaqueous electrolyte secondary battery according to the present disclosure, since the sum of the weights of the power generating element and the nonaqueous electrolyte contained in the power generating element is 200 g or more, obtainment of a high battery capacity is facilitated. Moreover, since the connection portion of the collector includes a first-side inclined portion, and the above sum of the weights is 500 g or less, internal short circuiting caused by dropping the battery with the surface provided with the terminals of the positive and negative electrodes facing down can be prevented without having the collector have a complex structure such as the branched shape. Accordingly, the weight of the secondary battery can be reduced by simplifying the structure of the collector.

BRIEF DESCRIPTION OF THE SEVERAL VIEWS OF THE DRAWINGS

FIG. 5A is a cross-sectional view selectively illustrating a structure joining the sealing body, a positive electrode terminal, and a negative electrode terminal to a positive electrode collector and a negative electrode collector in FIG. 1, FIG. 5B is a diagram illustrating a receiving member and an insulator film on the other side with the positive electrode collector and a power generating element in between, and FIG. 5C is a diagram illustrating a receiving member and an insulator film on the other side with the negative electrode collector and the power generating element in between;

FIG. 13A illustrates the positive electrode collector before the drop, and FIG. 13B illustrates the positive electrode collector after the drop.

DETAILED DESCRIPTION OF THE INVENTION

Figure 1:
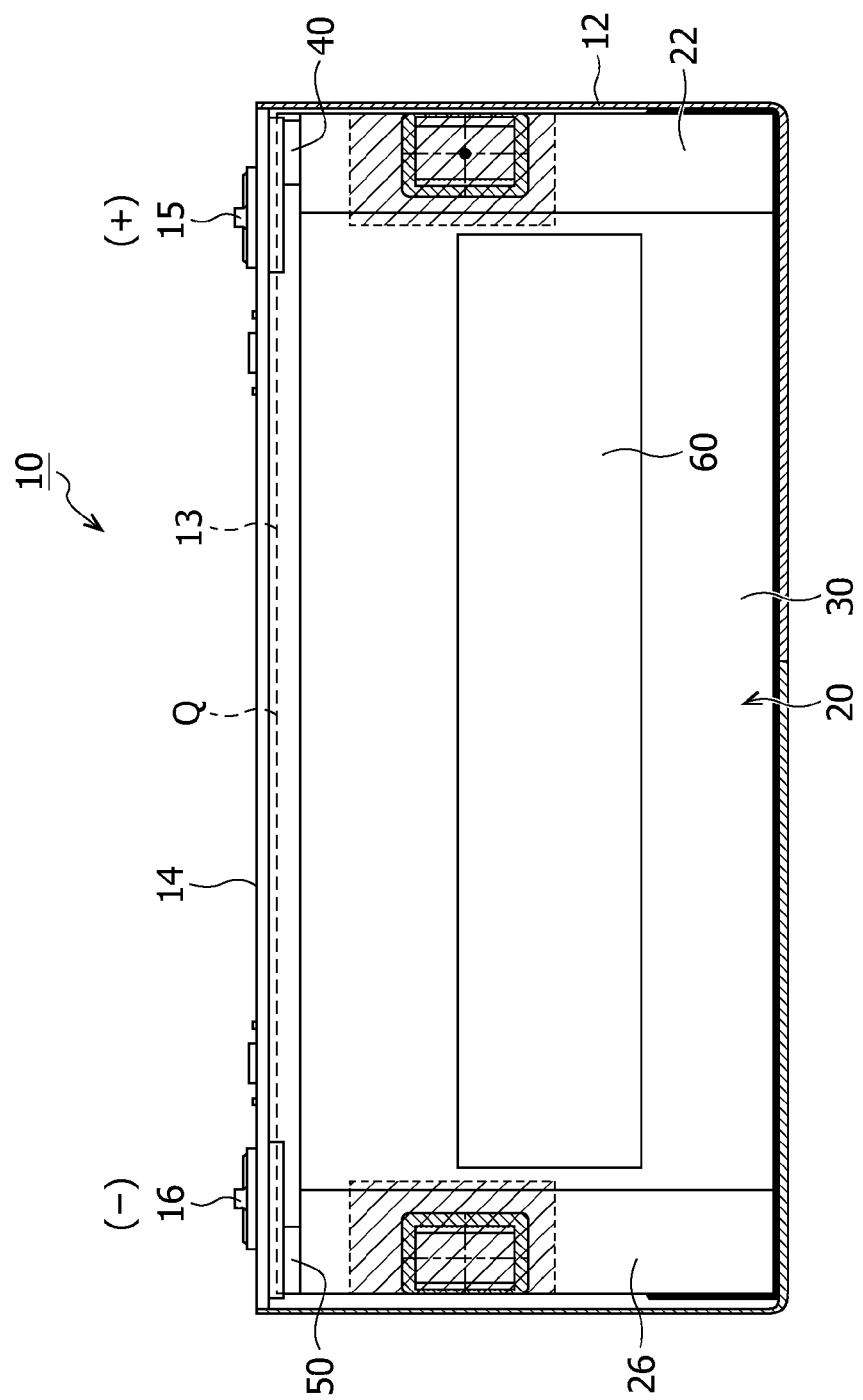
FIG. 1 is a diagram illustrating a cross-section of an outer package of a nonaqueous electrolyte secondary battery according to an exemplary embodiment.

Hereinafter, a nonaqueous electrolyte secondary battery according to an exemplary embodiment will be described in detail. Specific dimensions, ratios, and the like are to be determined taking the following description into consideration. In the present description, the expression "substantially" is intended to include meanings such as "completely" and "practically". For example, "substantially the same" is intended to include both "completely the same" and "practically the same". Furthermore, the term "end portion" denotes an end of an object and a vicinity of the end of the object. Furthermore, the shapes, materials, numbers, numeral values, and the like described in the following description are exemplifications for describing the nonaqueous electrolyte secondary battery, and may be changed according to the specification of the nonaqueous electrolyte secondary battery. Hereinafter, similar components will be designated with the same reference numeral in the description thereof.

The nonaqueous electrolyte secondary battery described hereinafter is a square secondary battery used as a power source or the like to drive, for example, an electric vehicle or a hybrid vehicle. Note that while a case in which a power generating element is a wound electrode body is described hereinafter, a stacked electrode body that is not wound may be used as the power generating element.

Figure 2:
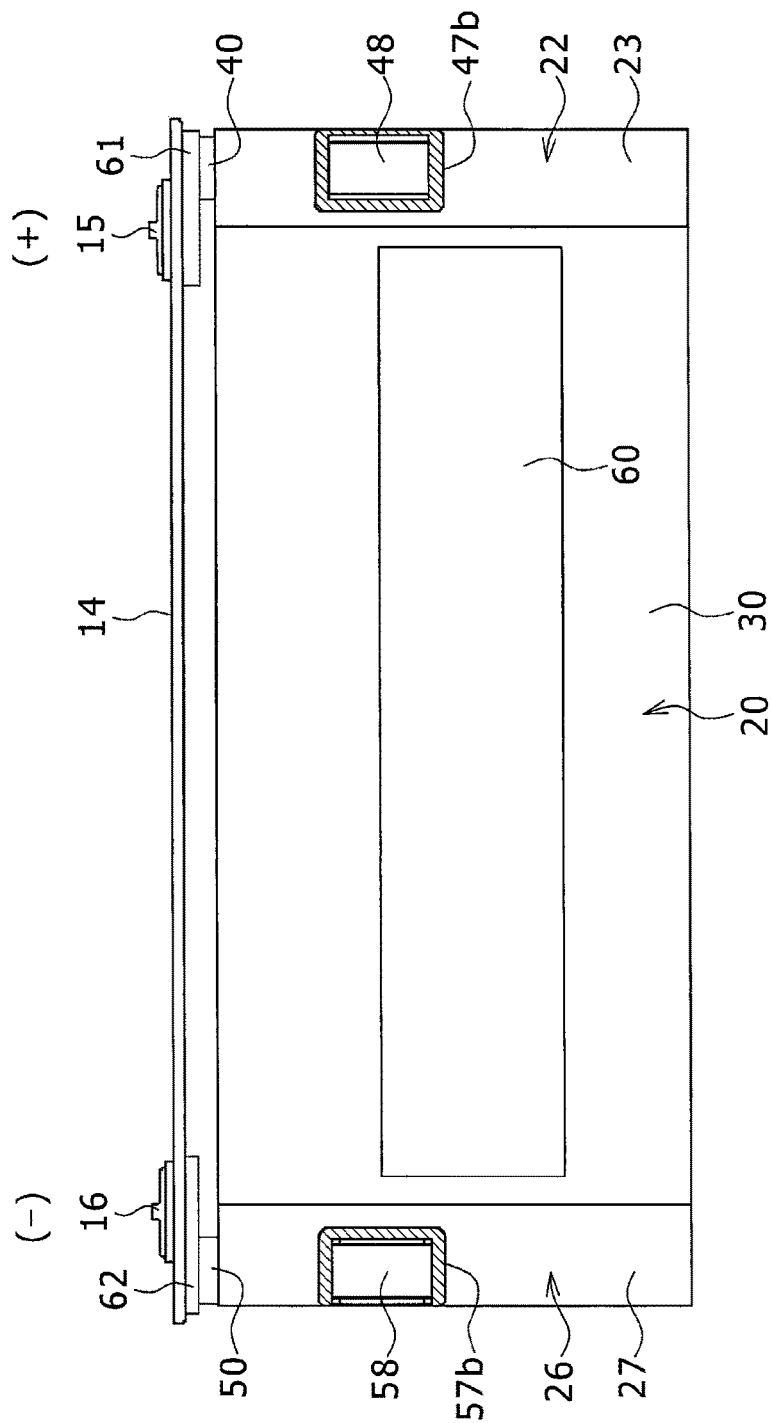
FIG. 2 is a diagram illustrating the nonaqueous electrolyte secondary battery illustrated in FIG. 1 in which the outer package has been removed therefrom.
Figure 3:
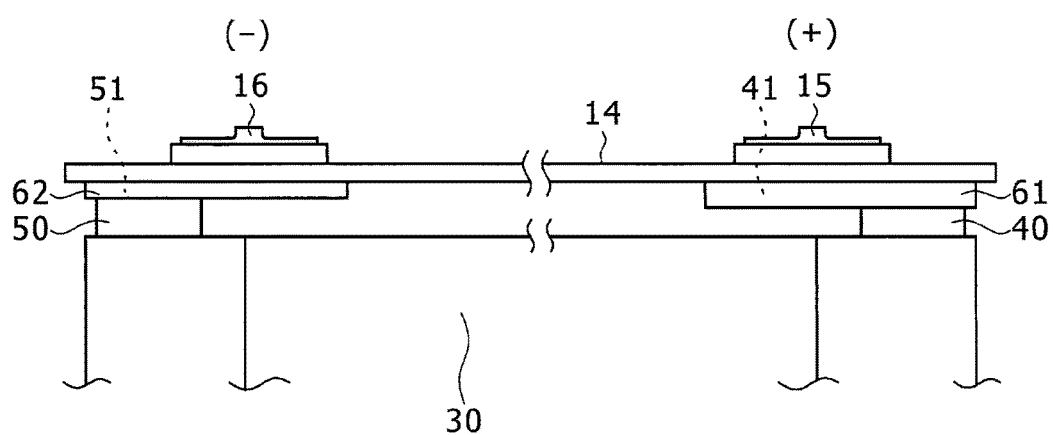
FIG. 3 is an enlarged view of an upper portion of FIG. 2.
Figure 4:
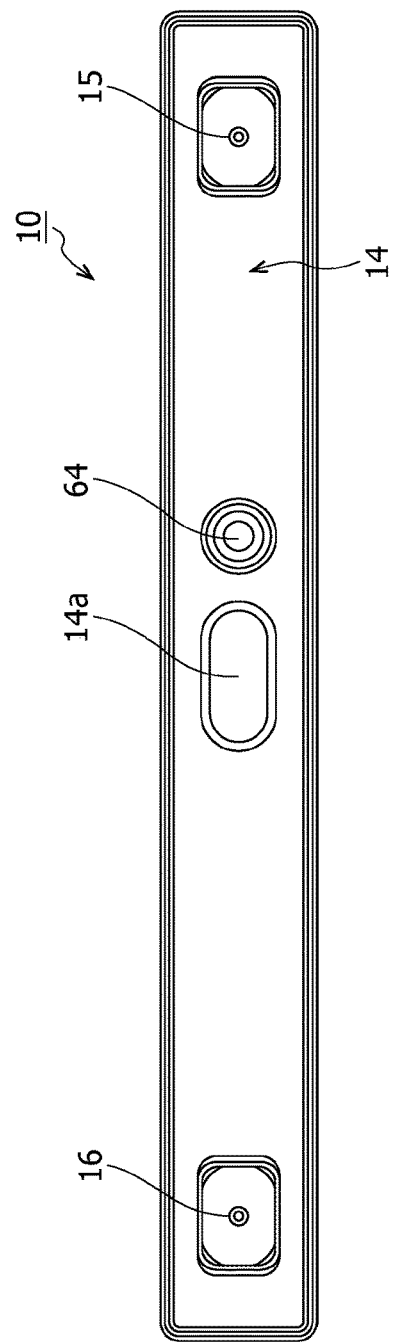
FIG. 4 is a diagram of the nonaqueous electrolyte secondary battery in FIG. 1 viewed from a sealing body side.
Figure 5:
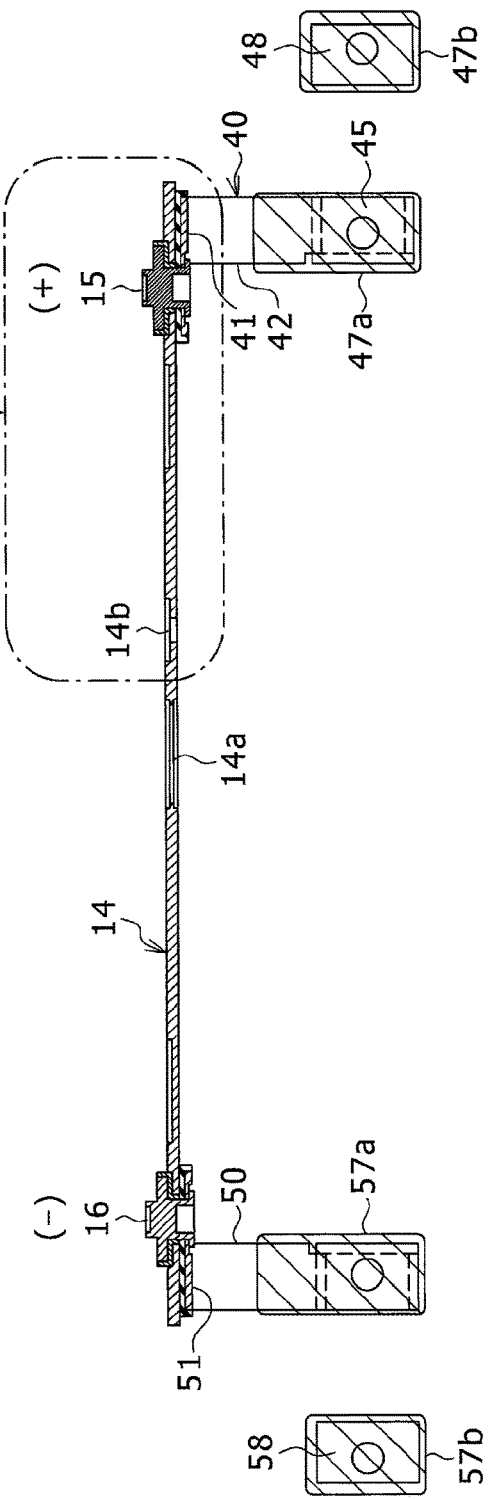

Hereinafter, referring to the drawings, a nonaqueous electrolyte secondary battery according to an exemplary embodiment will be described. Hereinafter, the nonaqueous electrolyte secondary battery is referred to as a secondary battery. FIG. 1 is a diagram illustrating a cross-sectioned outer package 12 of a secondary battery 10. FIG. 2 is a diagram illustrating the secondary battery 10 illustrated in FIG. 1 in which the outer package 12 has been removed therefrom. FIG. 3 is an enlarged view of an upper portion of FIG. 2. FIG. 4 is a diagram of the secondary battery 10 illustrated in FIG. 1 viewed from a sealing plate 14 side, the sealing plate 14 serving as a sealing body. Hereinafter, in the description related to FIGS. 1 to 7B, the sealing plate 14 side of the outer package 12 is referred to as the upper side and the side opposite to the sealing plate 14 is referred to as the lower side for convenience sake.

The secondary battery 10 includes the outer package 12 serving as a casing, and the wound electrode body 20 serving as the power generating element disposed inside the outer package 12. A nonaqueous electrolyte solution corresponding to nonaqueous electrolyte is contained inside the outer package 12. The nonaqueous electrolyte solution is, for example, an electrolytic solution containing lithium salt, and has lithium ion conductivity. Hereinafter, the wound electrode body 20 may be referred to as an electrode body 20.

Figures 7A, 7B:
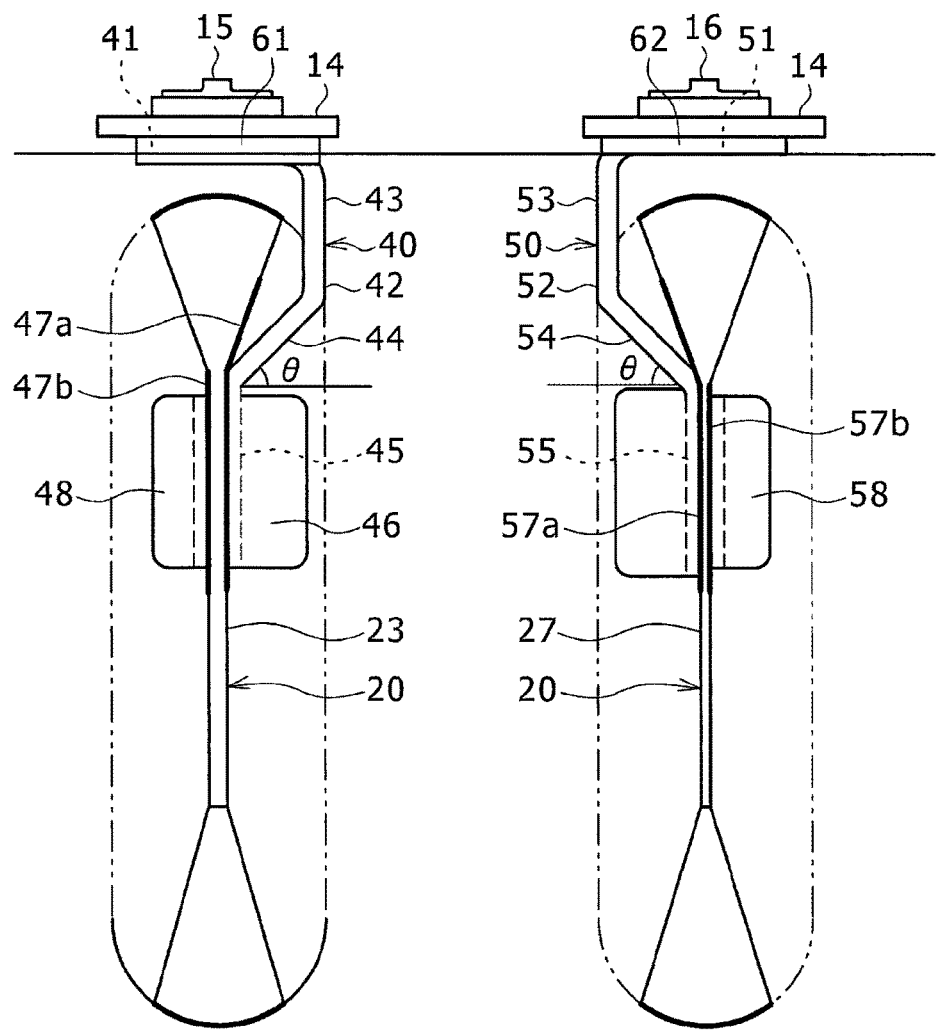
FIG. 7A is a diagram of the electrode body and the like illustrated in FIG. 2 viewed from the right side.
FIG. 7B is a diagram of the electrode body and the like illustrated in FIG. 2 viewed from the left side.

The electrode body 20 is a flat wound electrode body in which a positive electrode plate 22 and a negative electrode plate 26 are wound with a separator 30 interposed therebetween. The electrode body 20 is wound while, for example, a long positive electrode plate 22, a long separator 30, a long negative electrode plate 26, and a long separator 30 are stacked. The electrode body 20 is wound so that the separator 30 is disposed at the outermost periphery. Furthermore, as illustrated in FIGS. 7A and 7B described later, two end portions of the electrode body 20 on the sealing plate 14 side and the other side in the up-down direction each have an arc shape.

As illustrated in FIG. 1, the metal outer package 12 is boxed-shaped and has an opening at the upper end, and the secondary battery 10 includes the sealing plate 14 that closes the opening. The outer package 12 and the sealing plate 14 may be made of aluminum or an aluminum alloy. A positive electrode terminal 15 protrudes from the sealing plate 14 at one end portion (the right end portion in FIG. 1) of the sealing plate 14 in the longitudinal direction, and a negative terminal 16 protrudes from the sealing plate at the other end portion (the left end portion in FIG. 1) of the sealing plate 14 in the longitudinal direction. The positive electrode terminal 15 and the negative electrode terminal 16 each inserted into a respective one of two through holes formed in the sealing plate 14 with resin gaskets interposed therebetween are fixed and attached to the sealing plate 14. A winding axis of the electrode body 20 is parallel to the longitudinal direction (the left-right direction in FIGS. 1 and 2) of the sealing plate 14. Insulation between the electrode body 20 and the outer package 12 is achieved by an insulation sheet 13, which is inside the outer package 12 and is folded and bent in a box shape so as to include the portion illustrated by the broken line Q in FIG. 1, cover around the electrode body 20. The insulation sheet 13 is not disposed between the sealing plate 14 and the electrode body 20.

The positive electrode plate 22 is a member in which a positive electrode active material mixture layer containing a positive electrode active material is formed on both surfaces of a positive electrode core body formed of an aluminum foil, for example. A lithium-transition metal oxide that allows insertion and desorption of lithium ion can be used as the positive electrode active material. Other than the positive electrode active material, the positive electrode active material mixture layer may, desirably, contain a binding material and a conductive material. The positive electrode plate 22 before winding includes a positive electrode core body exposed portion 23 at one end portion in the width direction.

The negative electrode plate 26 is a member in which a negative electrode active material mixture layer containing a negative electrode active material is formed on both surfaces of a negative electrode core body formed of a copper foil, for example. A carbon material or a silicon compound that allows insertion and desorption of lithium ion can be used as the negative electrode active material. Other than the negative electrode active material, the negative electrode active material mixture layer may, desirably, contain a binding material. The negative electrode plate 26 before winding includes a negative electrode core body exposed portion 27 at one end portion in the width direction.

As illustrated in FIG. 2, the wound positive electrode core body exposed portion 23 is disposed at one end portion (a right end portion in FIG. 2) of the electrode body 20 in a winding axis direction (the left-right direction in FIG. 2) that is a direction in which the winding axis extends. The wound negative electrode core body exposed portion 27 is disposed at the other end portion (a left end portion in FIG. 2) of the electrode body 20 in the winding axis direction.

The inner separator 30 in the wound state is disposed between the positive electrode plate 22 and the negative electrode plate 26, and electrically isolates the positive electrode plate 22 and the negative electrode plate 26 from each other. The separator 30 disposed on the outermost periphery prevents the outermost electrode plate and external members from becoming short circuited. For example, the outer separator 30 disposed on the outermost periphery, the negative electrode plate 26, the inner separator 30, the positive electrode plate 22, and the outer separator 30, and the negative electrode plate 26 are arranged from the outermost layer towards the inner side in this order in the electrode body 20. The above arrangement is repeated. Although described in detail later, when the wound electrode body 20 receives an impact force due to the fall of the secondary battery, the outer separator 30 disposed on the outermost periphery may impinge on a member on the sealing plate 14 side and may become broken through. With the above, the electrode plate on the inner side and a member on the sealing plate 14 side, for example, a positive electrode collector 40 and the negative electrode plate 26, may become electrically in contact with each other and may become short circuited. The exemplary embodiment prevents such a trouble from occurring.

Furthermore, in the electrode body 20, an end portion of the separator 30 on a winding end side disposed on the outermost periphery is stuck on a lateral side of the electrode body 20 in the thickness direction with an insulating tape 60 so that the end portion on the winding end side is fixed to an outer peripheral portion of the electrode body 20.

Moreover, the positive electrode collector 40 is electrically connected to the wound positive electrode core body exposed portion 23 (FIG. 2). With the above, the positive electrode collector 40 is electrically connected to the positive electrode plate 22. The positive electrode collector 40 is connected to a positive electrode receiving member 48 disposed on the other side (the front side of the paper of FIG. 2) of the electrode body 20 in the thickness direction in an integrated manner by resistance welding with the positive electrode core body exposed portion 23 interposed therebetween. The positive electrode collector 40 is electrically connected to a lower end portion of the positive electrode terminal 15 penetrating a first insulating member 61 (FIGS. 3 and 6) described later in the up-down direction in a first base portion 41 (see FIGS. 6 and 9) described later.

A negative electrode collector 50 is electrically connected to the wound negative electrode core body exposed portion 27 (FIG. 2). With the above, the negative electrode collector 50 is electrically connected to the negative electrode plate 26. The negative electrode collector 50 is connected to a negative electrode receiving member 58 disposed on the other side (the front side of the paper of FIG. 2) of the electrode body 20 in the thickness direction in an integrated manner by resistance welding with the negative electrode core body exposed portion 27 interposed therebetween. The negative electrode collector 50 is electrically connected to a lower end portion of the negative electrode terminal 16 penetrating a second insulating member 62 described later in the up-down direction in the second base portion 51 (see FIG. 5A) described later. The positive electrode collector 40 and the negative electrode collector 50 will be described in detail later.

The opening of the outer package 12 is closed by a sealing plate 14 welded to an opening end portion thereof. FIG. 5A is a cross-sectional view selectively illustrating a structure joining the sealing plate 14, the positive electrode terminal 15, and the negative electrode terminal 16 to the positive electrode collector 40 and the negative electrode collector 50 in FIG. 1. FIG. 5B is a diagram illustrating the positive electrode receiving member 48 and an insulator film 47b on the opposite side with the positive electrode collector 40 and the electrode body 20 interposed in between. FIG. 5C is a diagram illustrating the negative electrode receiving member 58 and an insulator film 57b on the opposite side with the negative electrode collector 50 and the electrode body 20 interposed in between.

Figure 6:
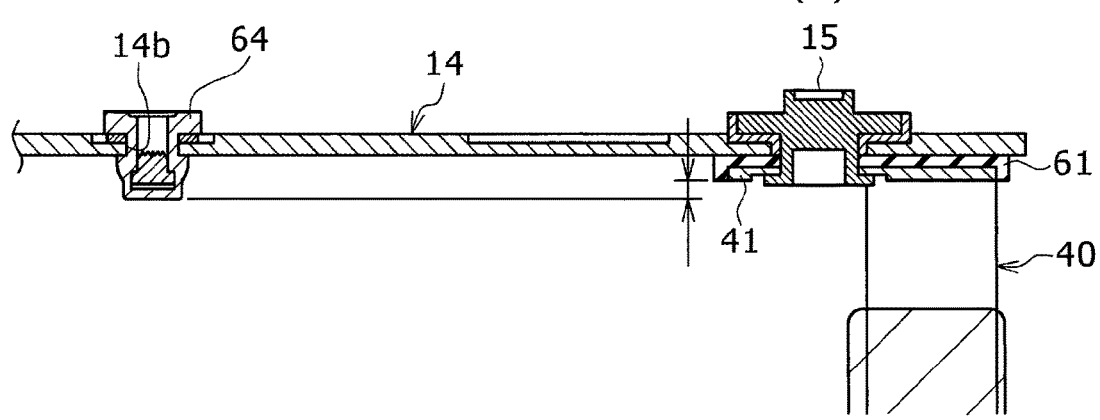
FIG. 6 is an enlarged diagram of VI portion in FIG. 5A and illustrates an injection hole of the sealing body illustrated in FIG. 5A with a lid attached thereto.

As illustrated in FIGS. 4 and 5A, a gas discharge valve 14a that becomes open by being broken when a gas pressure equivalent to or higher than a predetermined value is applied thereto is formed in the middle portion of the sealing plate 14 in the longitudinal direction. Furthermore, an injection hole 14b is formed in the sealing plate 14 and near the gas discharge valve 14a. The injection hole 14b is for injecting a nonaqueous electrolyte solution into the outer package 12. Furthermore, as illustrated in FIG. 6, after the nonaqueous electrolyte solution is injected into the outer package 12, the injection hole 14b is sealed by attaching a rivet 64 serving as a lid thereto. Illustration of the rivet 64 is omitted in FIGS. 1, 2, and 5A.

Figure 8:
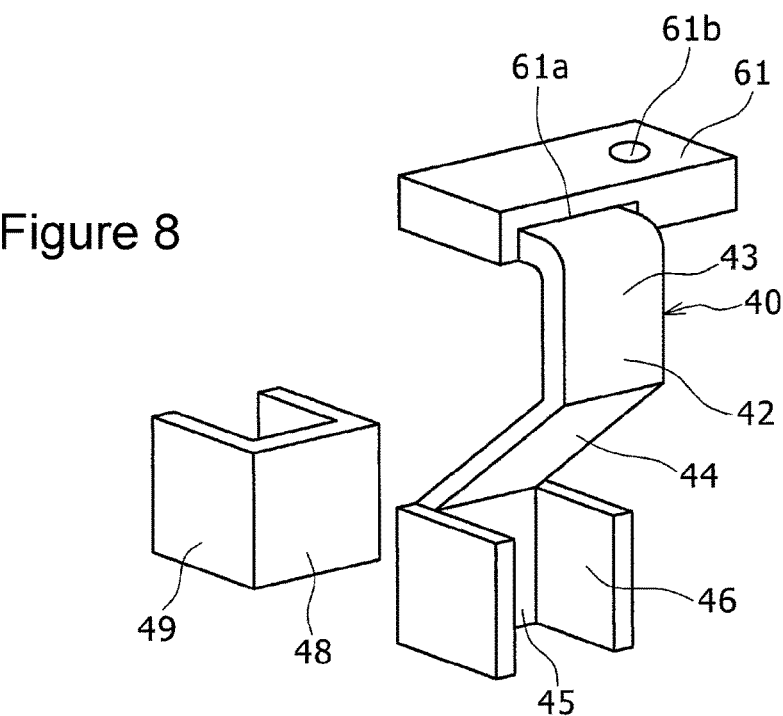
FIG. 8 is a perspective view selectively illustrating the positive electrode collector and a first insulating member fitted together, and the receiving member in FIG. 5A.
Figure 9:
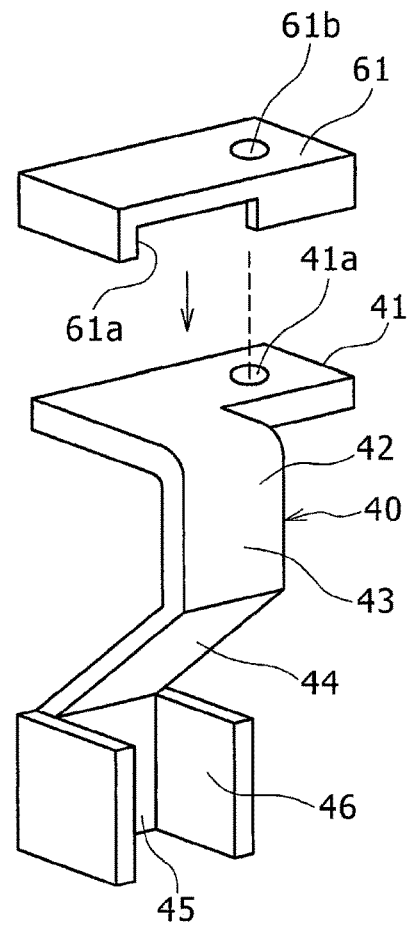
FIG. 9 is an exploded perspective view of the positive electrode collector and the first insulating member that are fitted together in FIG. 8.

The positive electrode collector 40 and the negative electrode collector 50 will be described next in detail. FIG. 7A is a diagram of the electrode body 20 and the like in FIG. 2 viewed from the right side, and FIG. 7B is a diagram of the electrode body 20 and the like in FIG. 2 viewed from the left side. FIG. 8 is a perspective view selectively illustrating the positive electrode collector and the first insulating member fitted together, and the receiving member in FIG. 5A. FIG. 9 is an exploded perspective view of the positive electrode collector and the first insulating member that are fitted together in FIG. 8.

The positive electrode collector 40 is formed of aluminum or an aluminum alloy. The negative electrode collector 50 is formed of copper or a copper alloy. Since the basic shapes of the positive electrode collector 40 and the negative electrode collector 50 are substantially the same, hereinafter, the positive electrode collector 40 will be mainly described. As illustrated in FIGS. 7A, 8, and 9, the positive electrode collector 40 includes the first base portion 41 (FIG. 9) disposed near the sealing plate 14, and a first lead portion 42 that is connected to an end portion of the first base portion 41 and that is disposed so as to extend towards the lower side that is the electrode body 20 side. The first base portion 41 and the first lead portion 42 correspond to a first-side base portion and a first-side lead portion, respectively. The first base portion 41 has a rectangular tabular shape and is disposed along the sealing plate 14 in a substantially parallel manner. A vertically penetrating hole 41a is formed in the first base portion 41. The first lead portion 42 includes a vertically extending portion 43 extending in the up-down direction from one end of the first base portion 41 in the width direction and from a first-side portion (a left-side portion in FIG. 9) of the first base portion 41 in the longitudinal direction, a first inclined portion 44, and an electrode body joining portion 45. The first inclined portion 44 and the electrode body joining portion 45 corresponds to a first-side inclined portion and a first-side power generating element joining portion, respectively. The first inclined portion 44 is inclined with respect to the thickness direction (the left-right direction of FIGS. 7A, 8, and 9) of the electrode body 20 from a lower end of the vertically extending portion 43. With the first inclined portion 44, short circuiting caused by the dropped secondary battery can be prevented from occurring. The above will be described in detail later.

The electrode body joining portion 45 extends in the up-down direction from a lower end of the first inclined portion 44 and faces a surface (a right side surface in FIG. 7A) of the electrode body 20 on a first side in the thickness direction. Ribs 46 are connected to both ends of the electrode body joining portion 45 in the width direction. The two ribs 46 are formed so as to extend substantially perpendicular to the electrode body joining portion 45. The electrode body joining portion 45 is disposed so as to face the surface (the right side surface in FIG. 7A) of the positive electrode core body exposed portion 23 of the electrode body 20 on the first side in the thickness direction, and is, together with the positive electrode receiving member 48, electrically connected to the positive electrode core body exposed portion 23 by welding. Similar to the electrode body joining portion 45, ribs 49 are connected to both ends of the positive electrode receiving member 48 in the width direction. In so doing, insulator films 47a and 47b are disposed between the electrode body joining portion 45 and the positive electrode core body exposed portion 23, and between the positive electrode core body exposed portion 23 and the positive electrode receiving member 48, respectively. Hatched areas in FIGS. 5A and 5B depict the insulator films 47a and 47b.

A round hole is formed in each of the insulator films 47a and 47b, and the electrode body joining portion 45, the positive electrode core body exposed portion 23 (FIG. 7A), and the positive electrode receiving member 48 are electrically connected to each other through the holes of the insulator films 47a and 47b. In the above, the electrode body joining portion 45 is joined to a lateral side of the positive electrode core body exposed portion 23. A projection that protrudes towards the positive electrode core body exposed portion may be formed in the portion of the electrode body joining portion 45 joined to the positive electrode core body exposed portion 23. With such a configuration, the electric current applied during resistance welding concentrates at the round hole or the projected portion and the weld strength can be increased.

As illustrated in FIGS. 6 and 8, the first base portion 41 of the positive electrode collector 40 is covered inside the first insulating member 61. More specifically, an upper surface and lateral sides of the first base portion 41 are covered by the first insulating member 61. An underside of the first base portion 41 not covered by the first insulating member 61 is substantially parallel to the electrode body 20 and is flush with a lower end portion of the first insulating member 61. The first insulating member 61 is disposed between the sealing plate 14 and the first base portion 41, and is disposed so as to insulate the positive electrode collector 40 and the sealing plate 14 from each other. The first insulating member 61 is box shaped open on the lower end. The first lead portion 42 is led out from the end portion of the first base portion 41 through a cut-out 61a formed in one end (an end on the front side of the paper of FIG. 9) of the first insulating member 61 in the width direction.

A vertically penetrating hole 61b is formed in a top plate portion of the first insulating member 61. The lower end portion of the positive electrode terminal 15 illustrated in FIG. 6 protrudes to the lower side with respect to the first base portion 41 through the holes of the first insulating member 61 and the first base portion 41, and the portion protruding to the lower side is riveted to the first base portion 41 so that an electrical connection is established. Note that the riveted portion of the positive electrode terminal 15 and the first base portion 41 are desirably connected further by welding. Furthermore, a recess is desirably formed in the underside of the first base portion 41, and the riveted portion of the lower end portion of the positive electrode terminal 15 is desirably disposed inside the recess. Furthermore, a lower end of the riveted portion of the positive electrode terminal 15 is desirably positioned above the underside of the first base portion 41.

As illustrated in FIG. 7B, the negative electrode collector 50 includes the second base portion 51 and a second lead portion 52. The second base portion 51 and the second lead portion 52 corresponds to a second-side base portion and a second-side lead portion, respectively. Similar to the first base portion 41 of the positive electrode collector 40, the second base portion 51 is disposed along the sealing plate 14. Similar to the first lead portion 42 of the positive electrode collector 40, the second lead portion 52 is connected to an end portion of the second base portion 51 and is disposed so as to extend towards the electrode body 20. An electrode body joining portion 55 of the second lead portion 52 is disposed so as to face a surface of the negative electrode core body exposed portion 27 of the electrode body 20 on the first side in the thickness direction (the left side surface in FIG. 7B) and is joined thereto so as to be connected to the negative electrode core body exposed portion 27. The electrode body joining portion 55 corresponds to a second-side power generating element joining portion. The position of the connection between the second base portion 51 and the second lead portion 52 in the negative electrode collector 50 in the longitudinal direction (the left-right direction in FIG. 2) of the sealing plate 14 is opposite to that of the connection between the first base portion 41 and the first lead portion 42 of the positive electrode collector 40. The configuration of the negative electrode collector 50 other than the above is similar to the configuration of the positive electrode collector 40. For example, the second lead portion 52 in FIG. 7B includes a vertically extending portion 53, and a second inclined portion 54 that is inclined with respect to the thickness direction of the electrode body 20 from a lower end of the vertically extending portion 53. The second inclined portion 54 corresponds to a second-side inclined portion. With the second inclined portion 54, short circuiting caused by the dropped secondary battery can be prevented from occurring. Similar to the first inclined portion 44 of the positive electrode collector 40, the above will be described in detail later.

Upper surface and lateral surfaces of the second base portion 51 of the negative electrode collector 50 is covered by the second insulating member 62. An underside of the second base portion 51 is not covered by the second insulating member 62 and is exposed. Furthermore, the underside of the second base portion 51 is also substantially parallel to the electrode body 20 and is flush with a lower end portion of the second insulating member 62. The lower end portion of the negative electrode terminal 16 that has penetrated through the second insulating member 62 and the second base portion 51 is electrically connected to the second base portion 51. The second insulating member 62 is disposed between the sealing plate 14 and the second base portion 51, and is disposed so as to insulate the negative electrode collector 50 and the sealing plate 14 from each other. Furthermore, insulator films 57a and 57b are disposed between the electrode body joining portion 55 of the negative electrode collector 50 and the negative electrode core body exposed portion 27, and between the negative electrode core body exposed portion 27 and the negative electrode receiving member 58, respectively. The electrode body joining portion 55 of the negative electrode collector 50, the negative electrode core body exposed portion 27, and the negative electrode receiving member 58 are electrically connected to each other through the holes of the insulator films 57a and 57b.

Referring next to FIGS. 7A to 9 and other figures, the first inclined portion 44 of the positive electrode collector 40 and the second inclined portion 54 of the negative electrode collector 50 will be described. The first inclined portion 44 of the positive electrode collector 40 is inclined with respect to the thickness direction towards the outer side in the thickness direction of the electrode body 20 from a portion facing the lateral side of the positive electrode core body exposed portion 23 in the thickness direction towards the first base portion 41. Meanwhile, the second inclined portion 54 of the negative electrode collector 50 is inclined with respect to the thickness direction towards the outer side in the thickness direction of the electrode body 20 from a portion facing the lateral side of the negative electrode core body exposed portion 27 in the thickness direction towards the second base portion 51. By forming such inclined portions 44 and 54, force applied from the electrode body 20 to the sealing plate 14 side through the collectors 40 and 50 can be alleviated when the secondary battery is dropped with the positive and negative electrode terminals positioned on the lower side. Specifically, boundaries between the inclined portions 44 and 54, and the other portions are bent and deformed with the force applied to the lower sides of the collectors 40 and 50 from the electrode body so that the impact is absorbed.

Figure 10:
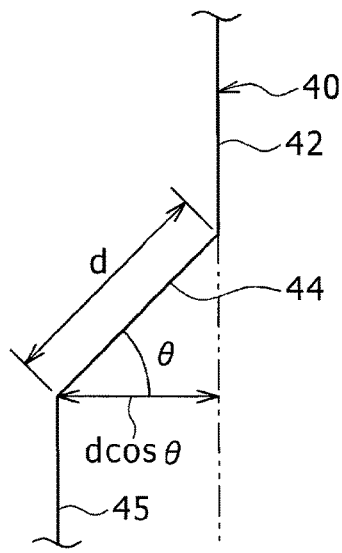
FIG. 10 is a diagram illustrating the positive electrode collector, illustrated in FIG. 7A, having the minimum thickness to describe the relationship between an angle of inclination θ, a longitudinal direction length d of the first inclined portion of the positive electrode collector, and d cos θ.

Assume that $\theta$ is an angle of inclination of the inclined portions 44 and 54 with respect to the thickness direction when inclining the first inclined portion 44 and the second inclined portion 54 in the thickness direction from portions facing the surface of the electrode body 20 on the first side in the thickness direction, and d is a length of the inclined portions 44 and 54 in the longitudinal direction. In such a case, the value d×cos $\theta$ is preferably 4.6 mm or more. FIG. 10 is a diagram illustrating the positive electrode collector 40 having the minimum thickness to describe the relationship between the angle $\theta$ of inclination, the longitudinal direction length d of the first inclined portion 44 of the positive electrode collector 40, and d cos $\theta$. Note that the first inclined portion 44 and the second inclined portion 54 may have different angles $\theta$ of inclination, and the inclined portions 44 and 54 may have different longitudinal direction lengths d. The value d×cos $\theta$ is a length of the inclined portions 44 and 54 in a direction orthogonal to the dropping direction, and the moment applied from the electrode body 20 to the ends of the inclined portions 44 and 54 on the electrode body side when dropped can be made larger by increasing the length. With the above, the impact absorbing ability can be increased owing to the bending and deformation of the portions including the inclined portions 44 and 54 and the vertically extending portions 43 and 53, and by setting the value d×cos $\theta$ to 4.6 mm or more, a noticeable effect is obtained. Note that the value d×cos $\theta$ is preferably 10.8 mm or less due to the restriction caused by the size of the outer package 12.

Moreover, the sum of the weight of the electrode body 20 and the weight of the nonaqueous electrolyte solution contained in the electrode body 20 is restricted within the range of 200 g or more to 500 g or less. With the above, a high battery capacity is readily obtained. Moreover, as described above, the lead portions 42 and 52 of the positive electrode collector 40 and the negative electrode collector 50 include the inclined portions 44 and 54, and the sum of the above weights is 500 g or less. With the above, when the secondary battery 10 is dropped with the positive electrode terminal and the negative electrode terminal positioned on the lower side, the inclined portions 44 and 54 are deformed so as to release the impact force, applied from the upper side of the electrode body 20, obliquely downwards. Accordingly, the impact force created when the electrode body 20 impinges on the base portions 41 and 51 of the collectors 40 and 50 can be alleviated, and internal short circuiting that is a short circuit of the positive and negative electrodes of the secondary battery can be prevented from being caused. Furthermore, since the collector does not have to adopt a complicated structure, such as a branched-shape, to prevent internal short circuiting of the dropped secondary battery, the weight of the secondary battery 10 can be reduced. Furthermore, an increase in the cost of the secondary battery 10 can be prevented by simplification of the structure of the collector.

In order to obtain a high-performance vehicle, secondary batteries 10 mounted and used in vehicles, such as hybrid vehicles, are required to increase the capacity thereof. However, an increase in the capacity of the secondary battery 10 is accompanied by an increase in the weight of the electrode body 20. As a measure of the above, one can conceive of branching the collector into two and having the electrode body 20 be supported by two arm portions. However, problems such as an increase in the weight of the secondary battery 10 and an increase in cost are created with such a measure. The exemplary embodiment is capable of overcoming such problems. Furthermore, in a case in which the sum of the weight of the electrode body 20 and the weight of the nonaqueous electrolyte solution contained in the electrode body 20 is 200 g or more, and in which both of the collectors 40 and 50 do not have any inclined portions, internal short circuiting is easily caused when the secondary battery 10 has been dropped with the positive and negative electrode terminals positioned on the lower side. In the exemplary embodiment, since inclined portions 44 and 54 are formed in the collectors 40 and 50, a noticeable effect can be obtained when the sum of the weight is 200 g or more.

A case in which the positive electrode collector 40 and the negative electrode collector 50 include the inclined portions 44 and 54, respectively, has been described above. However, between the positive electrode collector 40 and the negative electrode collector 50, only either one of the collectors, for example, the collector formed of a material with a smaller strength against bending, for example, the positive electrode collector 40, may alone include the inclined portion. In a case in which the negative electrode collector 50 alone includes the inclined portion, the inclined portion corresponds to the first-side inclined portion.

Figure 11:
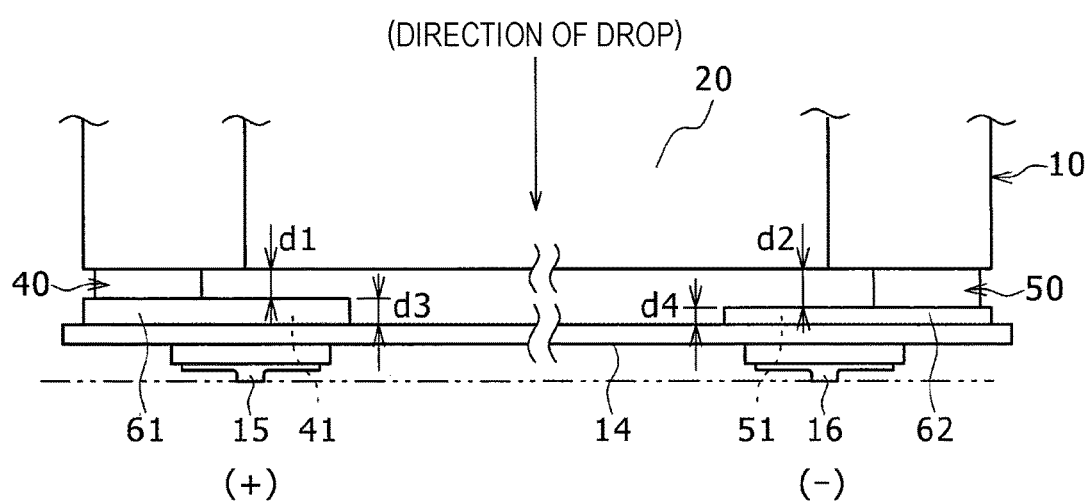
FIG. 11 is a diagram corresponding to FIG. 3 and illustrates a state immediately before the secondary battery, which has been dropped in the drop test, impinges on a horizontal surface.

FIG. 11 illustrates a state in which the secondary battery 10, the outer package 12 (FIG. 1) of which has been dismounted, drops with the positive electrode terminal 15 and the negative electrode terminal 16 positioned on the lower side. In the above, as illustrated in FIG. 11, assume that d1 is a positive electrode-side interval that is a distance between a surface of the first base portion 41 of the positive electrode collector 40, the surface being on the electrode body 20 side and passing an end portion (the right end portion in FIG. 11) of the first base portion 41 on the center side in the longitudinal direction of the sealing plate 14, and the end portion of the electrode body 20 on the sealing plate 14 side. Furthermore, assume that d2 is a negative electrode-side interval that is a distance between a surface of the second base portion 51 of the negative electrode collector 50, the surface being on the electrode body 20 side and passing an end portion (the left end portion in FIG. 11) of the second base portion 51 on the center side in the longitudinal direction of the sealing plate 14, and the end portion of the electrode body 20 on the sealing plate 14 side. In the above, a thickness d3 of the first base portion 41 is larger than a thickness d4 of the second base portion 51, and the positive electrode-side interval d1 is smaller than the negative electrode-side interval d2 (d1<d2). In addition to the above, a height (a length in the up-down direction in FIG. 11) of the first insulating member 61 around the first base portion 41 is also larger than a height of the second insulating member 62 around the second base portion 51.

In a case in which the positive electrode collector 40 is formed of aluminum or an aluminum alloy, and the negative electrode collector 50 is formed of copper or a copper alloy, the plate material constituting the positive electrode collector 40 may be larger. With the above, an internal resistance of the secondary battery can be reduced while not reducing the processability of the collector and while reducing the weight of the secondary battery 10. From such a viewpoint, rather than having the thickness of the plate material constituting the positive electrode collector 40 and the thickness of the plate material constituting the negative electrode collector 50 be the same, desirably, the plate material constituting the positive electrode collector 40 is thicker. Accordingly, a configuration satisfying d1<d2 described above is desirable. However, in such a case, when the secondary battery is dropped with the positive and negative electrode terminals positioned on the lower side, the first base portion 41 of the positive electrode collector 40 impinges on the electrode body 20 before the second base portion 51 of the negative electrode collector 50 facilitating short circuit to be caused. Furthermore, it is more likely that the positive electrode collector 40 is formed with a material that has a rigidity that is lower than the rigidity of the material of the negative electrode collector 50. Accordingly, the positive electrode collector 40 is more likely to impinge on the electrode body 20. In the exemplary embodiment, the inclined portions 44 and 54 are formed in the positive electrode collector 40 and the negative electrode collector 50, respectively; however, in a case in which the inclined portion is formed in only either one of the positive electrode collector 40 and the negative electrode collector 50 due to the above circumstance, it is desirable that the inclined portion is formed in only the positive electrode collector 40.

Furthermore, the underside (the lower end of the bottom portion) of the rivet 64 illustrated in FIG. 6 is desirably near to the electrode body 20 than the underside (the lower end of the bottom portion) of the first base portion 41 in the positive electrode collector 40. With such a configuration, as described later, when the secondary battery 10 is dropped with the positive electrode terminal and the negative electrode terminal positioned on the lower side, the underside of the rivet 64 is more likely to impinge on the electrode body 20 before the first base portion 41. With the above, the force applied to the dropped electrode body 20 can be dispersed as force from the first base portion 41 of the positive electrode collector 40 and force from the rivet 64 such that force applied from the first base portion 41 can be alleviated. With the above, drop resistance that is a capacity of the secondary battery to resist the impact of the drop described above can be improved. Desirably, the underside of the rivet is a flat surface. Furthermore, desirably, the underside of the rivet 64 does not have a positive polarity nor a negative polarity. Furthermore, desirably, an insulating member is disposed on the underside of the rivet 64. For example, it is desirable that the underside of the rivet 64 is coated with an insulating resin. Note that more desirably, in the longitudinal direction of the sealing plate 14, the injection hole 14b and the rivet 64 serving as a lid are, with respect to the gas discharge valve 14a, disposed on the side in which the first base portion 41 of the positive electrode collector 40 are disposed.

Figure 12:
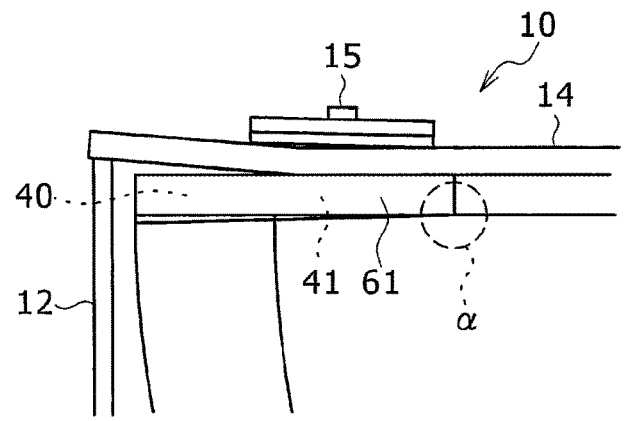
FIG. 12 is a diagram illustrating a state of the vicinity of the first base portion of the positive electrode collector after a drop test in which the secondary battery is dropped with the positive electrode terminal and the negative electrode terminal positioned on the lower side has been conducted.

FIG. 12 is a diagram illustrating a state of the vicinity of the first base portion of the positive electrode collector after a drop test in which the secondary battery is dropped with the positive electrode terminal and the negative electrode terminal positioned on the lower side has been conducted. Note that the state of the vicinity of the first base portion of the positive electrode collector after the drop test was confirmed by imaging the secondary battery 10 with an X-ray CT scanner. As illustrated in FIG. 12, it was confirmed that a corner portion of the first base portion 41 of the positive electrode collector 40 had impinged on the upper surface of the electrode body 20 at a portion indicated by the broken line cc due to the deformation of the positive electrode collector 40 caused by the weight of the dropped electrode body 20, and due to the electrode body 20 moving towards the sealing plate 14 side. Furthermore, it has been found out that the positive electrode terminal 15 and the negative electrode terminal 16 were impinged on the floor surface due to the drop, the portions of the sealing plate 14 in the vicinities of where the positive electrode terminal 15 and the negative electrode terminal 16 had been attached were deformed, and the corner portion of the first base portion 41 of the positive electrode collector 40 was easily in contact with the electrode body 20.

Furthermore, as described hereinafter, by increasing the thickness and the width (the dimension in the left-right direction of FIG. 2) of the electrode body 20, the impact of the drop can be alleviated in a further effective manner and the drip resistance can be improved.

Specifically, the thickness of the electrode body 20 containing the nonaqueous electrolyte solution is, preferably, 10 mm or more and, more preferably, is 14 mm or more. By employing such a preferable configuration, the area of the electrode body 20 in contact with the member on the sealing plate 14 side, for example, the first base portion 41, can be increased, and the impact force per unit area when coming in contact with the member on the sealing plate side can be alleviated. Accordingly, it will be more difficult to cause damage in the wound electrode body 20. Note that the thickness of the electrode body 20 containing the nonaqueous electrolyte solution is, preferably, 30 mm or less. In a case in which the thickness exceeds 30 mm, uniform permeation of the nonaqueous electrolyte solution may be hindered. Occurrence of distribution of the nonaqueous electrolyte solution may degrade the output characteristics and the cycle characteristics.

Furthermore, the width of the wound electrode body 20 is preferably 100 mm or more. By employing such a preferable configuration, since the weight of the electrode body 20 per unit width can be reduced, the impact force per unit area when coming in contact with the member on the sealing plate side can be alleviated. Accordingly, it will be more difficult to cause damage in the wound electrode body 20. Note that the width of the wound electrode body 20 is preferably 200 mm or less. In a case in which the width exceeds 200 mm, uniform permeation of the nonaqueous electrolyte solution may be hindered. Occurrence of distribution of the nonaqueous electrolyte solution may degrade the output characteristics and the cycle characteristics.

Furthermore, a cross-section of an upper end portion of the electrode body 20 on the sealing plate side has an arc shape, and as a radius of curvature of the arc shape becomes larger, the stress generated when the member on the sealing plate side impinges during the drop can be dispersed more; accordingly, the electrode body 20 can be made so as not to be damaged easily.

Furthermore, desirably, the positive electrode collector 40 is formed of aluminum or an aluminum alloy, the Young's Modulus is within the range of 65 GPa or more to 75 GPa or less, and the geometrical moment of inertia is within the range of $1.4 \times 10^{-12}$ m$^4$ or more to $6.2 \times 10^{-12}$ m$^4$ or less. The bending strength of the collector in the drop test when receiving an impact is determined by the Young's Modulus and the geometrical moment of inertia of the collector. The Young's Modulus is a value specific to the material. A geometrical moment I of inertia is calculated with $I=bh^3/12$, where h is a dimension of the collector in the thickness direction, and b is a dimension in the width direction. For example, in a case in which the width of the positive electrode collector 40 is set to 7.9 mm, when the thickness of the positive electrode collector 40 is 1.3 mm, the geometrical moment of inertia is at the lower limit, and when the thickness of the positive electrode collector 40 is 2.1 mm, the geometrical moment of inertia is at the upper limit. Note that the thicknesses and the widths in the positive electrode collector 40, specifically, the thicknesses and the widths of the first base portion 41, the vertically extending portion 43, the first inclined portion 44, and the electrode body joining portion 45 do not necessarily have to coincide with each other. The thickness and width of the positive electrode collector 40 described above denote the thickness and the width of each of the first inclined portion and the connection (the bent portion) that contribute to the deformation of the collector.

Furthermore, desirably, the negative electrode collector 50 is formed of copper or a copper alloy, the Young's Modulus is within the range of 110 GPa or more to 130 GPa or less, and the geometrical moment of inertia is within the range of $1.5 \times 10^{-13}$ m$^4$ or more to $9.2 \times 10^{-13}$ m$^4$ or less. For example, in a case in which the width of the negative electrode collector 50 is set to 8.3 mm, when the thickness of the negative electrode collector 50 is 0.6 mm, the geometrical moment of inertia is at the lower limit, and when the thickness of the negative electrode collector 50 is 1.1 mm, the geometrical moment of inertia is at the upper limit. Note that the thicknesses and the widths in the negative electrode collector 50, specifically, the thicknesses and the widths of the second base portion 51, the vertically extending portion 53, the second inclined portion 54, and the electrode body joining portion 55 do not necessarily have to coincide with each other. The thickness and width of the negative electrode collector 50 described above denote the thickness and the width of each of the second inclined portion and the connection (the bent portion) that contribute to the deformation of the collector.

Referring next to the secondary batteries according to Examples 1 to 9 and the secondary batteries according to Comparative Examples 1 to 3, results of the drop test will be described.

Common conditions of the drop test are as follows.

First, the configurations of the secondary batteries were as follows.

In the positive electrode plate, a positive electrode active material layer was formed on both surfaces of an aluminum foil serving as a positive electrode core body. The positive electrode active material layer contained $LiNi_{0.35}Co_{0.35}Mn_{0.30}O_2$ serving as a positive electrode active material, a carbon material serving as a conductive agent, and polyvinylidene fluoride (PVDF) serving as a binding material. Furthermore, a positive electrode active material layer in which the content rate (wt %) of the materials is $LiNi_{0.35}Co_{0.35}Mn_{0.30}O_2$/carbon material/PVDF=90/7/3 was used. In the negative electrode plate, a negative electrode active material layer was formed on both surfaces of a copper foil serving as a negative electrode core body. The negative electrode active material layer contained graphite, carboxymethyl cellulose (CMC), and styrene-butadiene rubber (SBR). Furthermore, a negative electrode active material layer in which the content rate (wt %) of the materials is graphite/CMC/SBR=98/1/1 was used. A separator 30 having a three-layer structure, namely, polypropylene (PP)/polyethylene (PE)/polypropylene (PP), was used. Furthermore, a nonaqueous electrolyte solution containing 0.3 vol % of vinylene carbonate (VC) serving as an additive agent in a mixed solvent in which the content rate is ethylene carbonate (EC)/ethyl methyl carbonate (EMC)/dimethylcarbonate (DMC)=30/30/40 vol % was used. Furthermore, a nonaqueous electrolyte solution containing 1.2 M of $LiPF_6$ serving as a solute was used. Furthermore, the positive electrode collector 40 was formed of aluminum, and except for the following Examples 5 and 6, a positive electrode collector with a width of 7.9 mm and a thickness of 1.4 mm was used. The negative electrode collector 50 was formed of copper, and a negative electrode collector with a width of 8.3 mm and a thickness of 0.80 mm was used. Furthermore, an outer package with a thickness of 18 mm, a width of 150 mm, and a height of 65 mm was used.

Drop Test

The test method was releasing and dropping the secondary battery 10 from a drop height of 1.4 m with the positive electrode terminal 15 and the negative electrode terminal 16 positioned on the lower side. Furthermore, the minimum distance between the electrode body 20 and a protrusion protruding from the sealing plate 14 towards the electrode body 20 was 2 mm. During the test, the environmental temperature was 25° C. Table 1 indicates the results of the drop test.

TABLE 1

| | Sum (g) of Weight of Power Generating Element and Weight of Electrolytic Solution Contained in Power Generating Element | Thickness (mm) of Power Generating Element (including Electrolytic Solution) | Inclination of Positive and Negative Electrode Collectors | Young's Modulus (Gpa) of Positive and Negative Electrode Collectors | Geometrical Moment of Inertia ($m^4$) of Positive and Negative Electrode Collectors | D × cosθ (mm) | Test Result |
|---|---|---|---|---|---|---|---|
| Example 1 | 240 | 17.5 | (Positive) Inclined | (Positive) 70 | (Positive) $1.8 \times 10^{-12}$ | (Positive) 5.7 | Valve Not Actuated (Good) |
| | | | (Negative) Not Inclined | (Negative) 120 | (Negative) $3.5 \times 10^{-13}$ | (Negative) 0 | Detachment of Welding in Negative Electrode Dent Identified |
| Example 2 | 240 | 17.5 | (Positive) Inclined | (Positive) 70 | (Positive) $1.8 \times 10^{-12}$ | (Positive) 5.7 | Valve Not Actuated (Good) |
| | | | (Negative) Inclined | (Negative) 120 | (Negative) $3.5 \times 10^{-13}$ | (Negative) 5.7 | Dent Identified |
| Example 3 | 240 | 17.0 | (Positive) Inclined | (Positive) 70 | (Positive) $1.8 \times 10^{-12}$ | (Positive) 5.7 | Valve Not Actuated (Good) |
| | | | (Negative) Inclined | (Negative) 120 | (Negative) $3.5 \times 10^{-13}$ | (Negative) 5.7 | Dent Identified |
| Example 4 | 240 | 30.0 | (Positive) Inclined | (Positive) 70 | (Positive) $1.8 \times 10^{-12}$ | (Positive) 5.7 | Valve Not Actuated (Good) |
| | | | (Negative) Inclined | (Negative) 120 | (Negative) $3.5 \times 10^{-13}$ | (Negative) 5.7 | Dent Identified |
| Example 5 | 240 | 17.5 | (Positive) Inclined | (Positive) 70 | (Positive) $1.4 \times 10^{-12}$ | (Positive) 5.7 | Valve Not Actuated (Good) |
| | | | (Negative) Inclined | (Negative) 120 | (Negative) $3.5 \times 10^{-13}$ | (Negative) 5.7 | Dent Identified |
| Example 6 | 240 | 17.5 | (Positive) Inclined | (Positive) 70 | (Positive) $6.2 \times 10^{-12}$ | (Positive) 5.7 | Valve Not Actuated (Good) |
| | | | (Negative) Inclined | (Negative) 120 | (Negative) $3.5 \times 10^{-13}$ | (Negative) 5.7 | Dent and Trace of Short Circuit Identified |
| Example 7 | 240 | 17.5 | (Positive) Inclined | (Positive) 70 | (Positive) $1.8 \times 10^{-12}$ | (Positive) 4.6 | Valve Not Actuated (Good) |
| | | | (Negative) Inclined | (Negative) 120 | (Negative) $3.5 \times 10^{-13}$ | (Negative) 5.7 | Dent Identified |
| Example 8 | 240 | 17.5 | (Positive) Inclined | (Positive) 70 | (Positive) $1.8 \times 10^{-12}$ | (Positive) 10.8 | Valve Not Actuated (Good) |
| | | | (Negative) Inclined | (Negative) 120 | (Negative) $3.5 \times 10^{-13}$ | (Negative) 5.7 | Dent Identified |
| Example 9 | 200 | 17.5 | (Positive) Inclined | (Positive) 70 | (Positive) $1.8 \times 10^{-12}$ | (Positive) 5.7 | Valve Not Actuated (Good) |
| | | | (Negative) Not Inclined | (Negative) 120 | (Negative) $3.5 \times 10^{-13}$ | (Negative) 0 | Detachment of Welding in Negative Electrode Dent Identified |
| Comparative Example 1 | 240 | 17.5 | (Positive) Not Inclined | (Positive) 70 | (Positive) $1.8 \times 10^{-12}$ | (Positive) 0 | Valve Actuated (Not Good) |
| | | | (Negative) Not Inclined | (Negative) 120 | (Negative) $3.5 \times 10^{-13}$ | (Negative) 0 | Detachment of Welding Dent and Trace of Short Circuit Identified |
| Comparative Example 2 | 200 | 17.5 | (Positive) Not Inclined | (Positive) 70 | (Positive) $1.8 \times 10^{-12}$ | (Positive) 0 | Valve Actuated (Not Good) |
| | | | (Negative) Not Inclined | (Negative) 120 | (Negative) $3.5 \times 10^{-13}$ | (Negative) 0 | Detachment of Welding Dent and Trace of Short Circuit Identified |

TABLE 1-continued

| | Sum (g) of Weight of Power Generating Element and Weight of Electrolytic Solution Contained in Power Generating Element | Thickness (mm) of Power Generating Element (including Electrolytic Solution) | Inclination of Positive and Negative Electrode Collectors | Young's Modulus (Gpa) of Positive and Negative Electrode Collectors | Geometrical Moment of Inertia (m$^4$) of Positive and Negative Electrode Collectors | D × cosθ (mm) | Test Result |
|---|---|---|---|---|---|---|---|
| Comparative Example 3 | 180 | 11.0 | (Positive) Not Inclined (Negative) Not Inclined | (Positive) 70 (Negative) 120 | (Positive) 1.8 × 10$^{-12}$ (Negative) 3.5 × 10$^{-13}$ | (Positive) 0 (Negative) 0 | Valve Not Actuated (Good) Dent Identified |

Figure 13A:
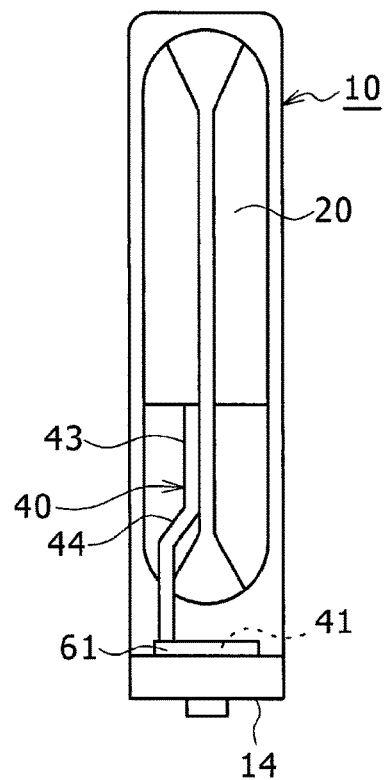
FIGS. 13A and 13B are drawings corresponding to FIG. 7A and illustrates the deforming state of the positive electrode collector in the drop test.
Figure 13B:
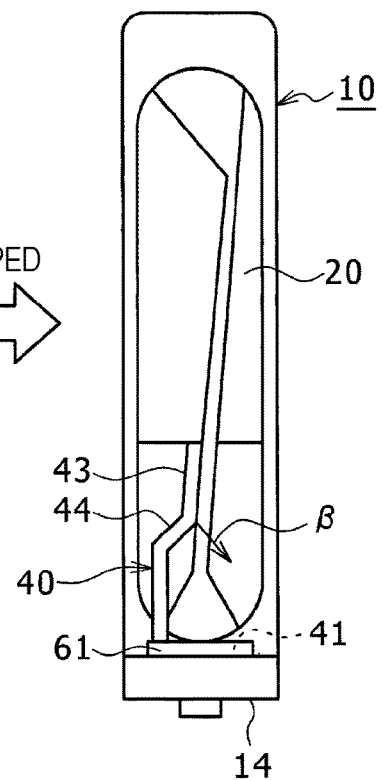

FIGS. 13A and 13B are drawings corresponding to FIG. 7A and illustrates the deforming state of the positive electrode collector 40 in the drop test. FIG. 13A illustrates the positive electrode collector 40 before the drop, and FIG. 13B illustrates the positive electrode collector 40 after the drop. Note that for the sake of description, the ribs 46, the positive electrode receiving member, the ribs 49 are omitted and the positive electrode terminal 15 is depicted in a simplified manner. As illustrated in FIGS. 13A and 13B, when dropped, a continuous portion between the first inclined portion 44 and the vertically extending portion 43 was bent and deformed in an arrow β direction in FIG. 13B with the moment applied to the end (the upper end in FIG. 13A) of the first inclined portion 44 on the electrode body side in FIG. 13A. Furthermore, with the above, it was conformed that the impact force applied to the lower end of the positive electrode collector can be absorbed.

Table 1 indicates the sum of the weight of the power generating element (electrode body 20) and the weight of the nonaqueous electrolyte solution contained in the power generating element, the thickness of the power generating element including the nonaqueous electrolyte solution, whether there is an inclined portion in the positive electrode collector and the negative electrode collector, and the Young's Modulus of the positive and negative electrode collectors. Furthermore, Table 1 indicates the geometrical moment of inertia of the lead portion of the positive electrode collector, and the d×cos θ as well. Furthermore, in Table 1, whether the gas discharge valve 14a has been activated, the state of the welding between the collector and the power generating element, and the state of the dent and the trace of short circuit are indicated as the test results. When short circuit is caused by the drop test, high-pressure gas is generated facilitating the actuation of the gas discharge valve 14a.

In Comparative Example 1, the sum of the weight of the electrode body 20 and the weight of the nonaqueous electrolyte solution contained in the electrode body 20 was 240 g, and a secondary battery having a configuration of the exemplary embodiment but shaped so at to have no inclined portion in the positive electrode collector 40 and the negative electrode collector 50 was used. Regarding the breakdown of the sum of the weights, the electrode body 20 was 180 g, and the electrolytic solution was 60 g. Furthermore, the battery capacity was 8 Ah. When the size of the electrode body 20 was checked with an X-ray CT scanner after aging of the secondary battery has been performed, the thickness was 17.5 mm, the width was 143 mm, and the height was 57 mm. Conduct of the drop test of Comparative Example 1 caused the actuation of the valve and generation of smoke due to short circuiting. Furthermore, the inner structure of the secondary battery after the test was observed with the X-ray CT scanner. The welded portion between the positive electrode collector and the electrode foil of the electrode body 20 had come off, such that there was no support of the electrode body 20. Furthermore, the secondary battery was decomposed, and the trace of short circuit was visually checked. A trace of short circuit was identified in the vicinity of the positive electrode terminal of the electrode body 20 and, further, the trace of the short circuit was extremely large.

Next, while having a similar configuration to that of Comparative Example 1, Comparative Example 2 was configured so that the sum of the weights of the electrode body 20 and the nonaqueous electrolyte solution contained in the electrode body 20 was 200 g. Regarding the breakdown of the sum of the weights, the electrode body 20 was 150 g, and the electrolytic solution was 50 g. Furthermore, the battery capacity was 6.5 Ah. The thickness of the electrode body 20 containing the nonaqueous electrolyte solution was 17.5 mm, the width was 143 mm, and the height was 47 mm. Conduct of the drop test of Comparative Example 2 caused the actuation of the valve and generation of smoke due to short circuiting. Furthermore, the inner structure of the secondary battery after the test was observed with the X-ray CT scanner. The welded portion between the positive electrode collector and the electrode foil of the electrode body 20 had come off, such that there was no support of the electrode body 20. Furthermore, the secondary battery was decomposed, and the trace of short circuit was visually checked. A trace of short circuit was identified in the vicinity of the positive electrode terminal of the electrode body 20, and the trace of the short circuit was small compared with that of Comparative Example 1.

Next, while having a similar configuration to that of Comparative Examples 1 and 2, Comparative Example 3 was configured so that the sum of the weights of the electrode body 20 and the nonaqueous electrolyte solution contained in the electrode body 20 was 180 g. Furthermore, the battery capacity was 5 Ah. As indicated in the test results in Table 1, in Comparative Example 3, actuation of the valve did not occur, and no trace of short circuit was seen on the electrode body 20 caused by the impingement between the collector and the electrode body 20. Furthermore, the inner structure of the secondary battery after the test was checked with the X-ray CT scanner. Although the electrode body 20 slightly moved inside the outer package 12, no change in particular from normal times was observed. It is considered that the test result was produced because the drop impact was small since the sum of the weights of the electrode body 20 and the electrolytic solution was small. With the above, it was confirmed that in a case in which the sum of the weights of the electrode body 20 and the nonaqueous electrolyte solution is 180 g or less, short circuit caused by the drop is not seen even if the collector did not have any inclined portions. Accordingly, as in the exemplary embodiment, the effect of the collector having an inclined portion becomes noticeable when the sum of the weights of the electrode body 20 and the nonaqueous electrolyte solution is 200 g or more.

Conversely, in Example 1, a positive electrode collector 40 with the first inclined portion 44 was used. The angle θ of inclination of the first inclined portion 44 was 45°, and d×cos θ=5.7 mm was satisfied. The drop test was conducted while configurations other than the above were the same as those of Comparative Example 1. In the test, the shape of the negative electrode collector 50 was the same as that in Comparative Example 1. In the test results, no actuation of the valve occurred. After the test, the inside of the secondary battery was observed with the X-ray CT scanner. Although bending of the positive electrode collector 40 was seen, a large change in the negative electrode collector 50 was not confirmed. However, the welded portion between the negative electrode collector 50 and the electrode foil of the electrode body 20 came off. Furthermore, when the secondary battery was decomposed and visual inspection was conducted, a dent in the electrode body 20 was identified. In Example 1, since the first inclined portion 44 in the positive electrode collector 40 had been provided, the impact created when the electrode body 20 impinged on the member of the sealing plate 14 side seems to have been alleviated.

Furthermore, in example 2, a secondary battery having the inclined portion in not only the positive electrode collector 40 but also in the negative electrode collector 50 was used. In the above, the angle of inclination of each of the inclined portions 44 and 54 of the collectors 40 and 50 was 45°, and d×cos θ=5.7 mm was satisfied. The drop test was conducted while configurations of the Example 2 other than the above was the same as those of Example 1. In the test results, the actuation of the valve did not occur. The inside was observed with the X-ray CT scanner after the test. Bending in the positive electrode collector 40 and the negative electrode collector 50 was identified, and different from Example 1, the welded portion between the electrode foil of the electrode body 20 and the collector did not come off. Compared to Example 1, since the dent in the vicinity of the negative electrode terminal in the electrode body 20 was, similar to the dent in the vicinity of the positive electrode terminal, small, it is considered that the result was produced because the impact caused by the electrode body 20 impinging on the member of the sealing plate side was further alleviated.

In Example 3, the thickness of the electrode body 20 containing the nonaqueous electrolyte solution was smaller than that of Example 2 and was 17.0 mm. Furthermore, the width of the electrode body 20 was 143 mm, and the height was 59 mm. The drop test was conducted while configurations other than the above were the same as those of Example 2. In the test results, no actuation of the valve occurred. Furthermore, when the secondary battery was decomposed and visual inspection was conducted, a dent in the electrode body 20 was identified. The dent was large compared with the dent in Example 2.

In Example 4, the thickness of the electrode body 20 containing the nonaqueous electrolyte solution was larger than that of Example 2 and was 30.0 mm. Furthermore, the width of the electrode body 20 was 143 mm, and the height was 33 mm. Furthermore, in accordance with the above, the thickness of the outer package 12 was 31.0 mm, and the height was 41.0 mm. The drop test was conducted while configurations other than the above were the same as those of Example 2. In the test results, no actuation of the valve occurred. Furthermore, when the secondary battery was decomposed and visual inspection was conducted, a dent in the electrode body 20 was identified. The dent was small compared with the dent in Example 2.

In Example 5, the thickness of the positive electrode collector 40 was 1.3 mm, and the width was the same as that of Example 2 and was 7.9 mm. In the above, the geometrical moment of inertia is $1.4 \times 10^{-12}$ m$^4$. The drop test was conducted while configurations other than the above were the same as those of Example 2. In the test results, no actuation of the valve occurred. Furthermore, when the secondary battery was decomposed and visual inspection was conducted, a dent in the electrode body 20 was identified. The dent was large compared with the dent in Example 2.

In Example 6, the thickness of the positive electrode collector 40 was 2.1 mm, and the width was the same as that of Example 2 and was 7.9 mm. In the above, the geometrical moment of inertia is $6.2 \times 10^{-12}$ m$^4$. The drop test was conducted while configurations other than the above were the same as those of Example 2. In the test results, no actuation of the valve occurred. Furthermore, when the secondary battery was decomposed and visual inspection was conducted, a dent in the electrode body 20 was small compared with the dent in Example 2. It was confirmed through the test results of Examples 5 and 6 that when the Young's Modulus of the positive electrode collector is 70 GPa, it is desirable that the geometrical moment of inertia is within the range of $1.4 \times 10^{-12}$ (m$^4$) or more to $6.2 \times 10^{-12}$ (m$^4$) or less.

In Example 7, the length of the first inclined portion 44 of the positive electrode collector 40 was 6.5 mm, the angle θ of inclination of the first inclined portion 44 was 45°, and d cos θ=4.6 mm was satisfied. The drop test was conducted while configurations other than the above was the same as those of Example 2. The test did not reach the point where the valve was actuated. Furthermore, when the secondary battery was decomposed and visual inspection was conducted, a dent in the electrode body 20 was large compared with the dent in Example 2. It is considered from the test results that while the moment caused by the drop became smaller by shortening the first inclined portion 44, similar to the other Examples, the impact force created by the electrode body 20 impinging on the member on the sealing plate 14 side was alleviated.

In Example 8, the length of the first inclined portion 44 of the positive electrode collector 40 was 15.2 mm, the angle θ of inclination of the first inclined portion 44 was 45°, and d cos θ=10.8 mm was satisfied. The drop test was conducted while configurations other than the above was the same as those of Example 2. The test did not reach the point where the valve was actuated. Furthermore, the secondary battery was decomposed after the test and visual inspection was conducted. A dent was small compared with the dents in Examples 2 and 7. It is considered from the test results that while the moment caused by the drop became larger by elongating the first inclined portion 44, compared with Examples 2 and 7, the impact force created by the electrode body 20 impinging on the member on the sealing plate 14 side was further alleviated.

In Example 9, a secondary battery in which the sum of the weights of the electrode body 20 and the nonaqueous electrolyte solution contained in the electrode body 20 is 200 g was used. Regarding the breakdown of the sum of the weights, the electrode body 20 was 150 g, and the electrolytic solution was 50 g. The drop test was conducted while configurations other than the above was the same as those of Example 1. The test did not reach the point where the valve was actuated. Furthermore, after the test, an inside inspection of the secondary battery was conducted with the X-ray CT scanner. Similar to Example 1, while bending of the positive electrode collector 40 was seen, a large change in the negative electrode collector 50 was not confirmed. Furthermore, the welded portion between the electrode foil of the electrode body 20 and the negative electrode collector 50 came off. Meanwhile, when the secondary battery was decomposed and visual inspection was conducted, a dent in the electrode body 20 was identified; however, the dent was small compared with the dent in Example 1. It is considered that the results were produced because, since the first inclined portion 44 was provided in the positive electrode collector 40, the impact created when the electrode body 20 impinged on the member of the sealing plate side seems to have been alleviated. Furthermore, it is considered that the dent was smaller because the impact force created when the electrode body 20 impinged on the member on the sealing plate side was small since, compared with Example 1, the sum of the weights of the electrode body 20 and the nonaqueous electrolyte solution was small, that is, 200 g.

Others

As illustrated in FIG. 7A, desirably, an outer surface of the first lead portion 42 is positioned outside (on the outer package 12 side) an outer surface of the first insulating member 61 in a short direction (the left-right direction in FIG. 7A) of the sealing plate 14. In other words, desirably, the shortest distance between the first lead portion 42 and the outer package 12 in the short direction of the sealing plate 14 is shorter than the shortest distance between the first insulating member 61 and the outer package 12 in the short direction of the sealing plate 14. With the above, the length of the first inclined portion 44 can be elongated further.

The shortest distance between the outer surface of the first lead portion 42 and the inner surface of the outer package 12 in the short direction of the sealing plate 14 is, preferably, in the range of 0.05 mm to 2.0 mm and, more preferably, is within the range of 0.05 mm to 1.0 mm. With the above, the length of the first inclined portion 44 can be elongated further. Furthermore, desirably, the secondary battery is in a state in which the outer surface of the first lead portion 42 presses the inner surface of the outer package 12 though the insulation sheet 13.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:
1. A nonaqueous electrolyte secondary battery, comprising:
 a flat power generating element including
  a positive electrode plate,
  negative electrode plate, and
  a separator that electrically isolates the positive electrode plate and the negative electrode plate from each other;
 an outer package, inside of which the power generating element is disposed;
 a sealing body that closes an opening of the outer package;
 a positive electrode collector electrically connected to the positive electrode plate;
 a negative electrode collector electrically connected to the negative electrode plate; and
 nonaqueous electrolyte,
 wherein at least one of the collectors between the positive electrode collector and the negative electrode collector includes a first-side base portion disposed near the sealing body, and a first-side lead portion disposed so as to be connected to one end portion of the first-side base portion and to extend towards the power generating element,
 wherein the first-side lead portion includes a first-side power generating element joining portion joined to a lateral side of the power generating element, and a first-side inclined portion inclined with respect to a thickness direction of the power generating element from the first-side power generating element joining portion towards an outer side in the thickness direction, and
 wherein a sum of a weight of the power generating element and a weight of the nonaqueous electrolyte contained in the power generating element is within a range of 200 g or more to 500 g or less, and
 a value of d×cos θ is in a range of 4.6 mm or more to 10.8 mm or less,
 where θ is, in the one of the collectors, an angle of inclination of the first-side inclined portion with respect to the thickness direction in a case in which the first-side inclined portion is inclined in the thickness direction from a portion facing a lateral surface of the power generating element in the thickness direction, and d is a length of the first-side inclined portion in a longitudinal direction, and
 wherein the one of the collectors is a positive electrode collector, and
 wherein the positive electrode collector is formed of aluminum or an aluminum alloy, a Young's Modulus is in a range of 65 G Pa or more to 75 G Pa or less, a geometrical moment of inertia of the first-side lead portion is in a range of $1.4 \times 10^{-12}$ m$^4$ or more to $6.2 \times 10^{-12}$ m$^4$ or less.

2. The nonaqueous electrolyte secondary battery according to claim 1,
 wherein the other one of the collectors between the positive electrode collector and the negative electrode collector includes a second-side base portion disposed near the sealing body, and a second-side lead portion disposed so as to be connected to one end portion of the second-side base portion and to extend towards the power generating element, and
 wherein the second-side lead portion includes a second-side power generating element joining portion joined to a lateral side of the power generating element, and a second-side inclined portion inclined with respect to the thickness direction of the power generating element from the second-side power generating element joining portion towards the outer side in the thickness direction.

3. The nonaqueous electrolyte secondary battery according to claim 1,
wherein the power generating element is a wound electrode body, a cross-section of an end portion of the wound electrode body on a sealing body side has an arc shape,
wherein a thickness of the wound electrode body containing the nonaqueous electrolyte is in a range of 10 mm or more to 30 mm or less, and
wherein a width of the wound electrode body is in a range of 100 mm or more to 200 mm or less.

4. The nonaqueous electrolyte secondary battery according to claim 1,
wherein the sealing body includes an injection hole;
the injection hole is sealed with a lid; and
an underside of the lid is closer than an underside of the first-side base portion to the flat power generating element.

5. The nonaqueous electrolyte secondary battery according to claim 2,
wherein the first-side base portion comprises the positive electrode collector;
the second-side base portion comprises the negative electrode collector;
a first insulating member is disposed between the sealing body and the first-side base portion;
a second insulating member is disposed between the sealing body and the second-side base portion; and
a height of the first insulating member around the first-side base portion is larger than a height of the second insulating member around the second-side base portion.

6. A nonaqueous electrolyte secondary battery, comprising:
a flat power generating element including
a positive electrode plate,
negative electrode plate, and
a separator that electrically isolates the positive electrode plate and the negative electrode plate from each other;
an outer package, inside of which the power generating element is disposed;
a sealing body that closes an opening of the outer package;
a positive electrode collector electrically connected to the positive electrode plate;
a negative electrode collector electrically connected to the negative electrode plate; and
nonaqueous electrolyte,
wherein at least one of the collectors between the positive electrode collector and the negative electrode collector includes a first-side base portion disposed near the sealing body, and a first-side lead portion disposed so as to be connected to one end portion of the first-side base portion and to extend towards the power generating element,
wherein the first-side lead portion includes a first-side power generating element joining portion joined to a lateral side of the power generating element, and a first-side inclined portion inclined with respect to a thickness direction of the power generating element from the first-side power generating element joining portion towards an outer side in the thickness direction, and
wherein a sum of a weight of the power generating element and a weight of the nonaqueous electrolyte contained in the power generating element is within a range of 200 g or more to 500 g or less, and
wherein the one of the collectors is a positive electrode collector, and
wherein the positive electrode collector is formed of aluminum or an aluminum alloy, a Young's Modulus is in a range of 65 G Pa or more to 75 G Pa or less, a geometrical moment of inertia of the first-side lead portion is in a range of $1.4 \times 10^{-12}$ m$^4$ or more to $6.2 \times 10^{-12}$ m$^4$ or less.

7. The nonaqueous electrolyte secondary battery according to claim 6,
wherein the other one of the collectors between the positive electrode collector and the negative electrode collector includes a second-side base portion disposed near the sealing body, and a second-side lead portion disposed so as to be connected to one end portion of the second-side base portion and to extend towards the power generating element, and
wherein the second-side lead portion includes a second-side power generating element joining portion joined to a lateral side of the power generating element, and a second-side inclined portion inclined with respect to the thickness direction of the power generating element from the second-side power generating element joining portion towards the outer side in the thickness direction.

8. The nonaqueous electrolyte secondary battery according to claim 6,
wherein the power generating element is a wound electrode body, a cross-section of an end portion of the wound electrode body on a sealing body side has an arc shape,
wherein a thickness of the wound electrode body containing the nonaqueous electrolyte is in a range of 10 mm or more to 30 mm or less, and
wherein a width of the wound electrode body is in a range of 100 mm or more to 200 mm or less.

9. The nonaqueous electrolyte secondary battery according to claim 6,
wherein the sealing body includes an injection hole;
the injection hole is sealed with a lid; and
an underside of the lid is closer than an underside of the first-side base portion to the flat power generating element.

10. The nonaqueous electrolyte secondary battery according to claim 7,
wherein the first-side base portion comprises the positive electrode collector;
the second-side base portion comprises the negative electrode collector;
a first insulating member is disposed between the sealing body and the first-side base portion;
a second insulating member is disposed between the sealing body and the second-side base portion; and
a height of the first insulating member around the first-side base portion is larger than a height of the second insulating member around the second-side base portion.

* * * * *